A. R. ROOT.
Corn Planter.

No. 27,740.

Patented Apr. 3, 1860.

UNITED STATES PATENT OFFICE.

ALONZO R. ROOT, OF CANTON, MISSOURI.

IMPROVEMENT IN SEEDING-MACHINES.

Specification forming part of Letters Patent No. 27,740, dated April 3, 1860.

*To all whom it may concern:*

Be it known that I, ALONZO R. ROOT, of Canton, in the county of Lewis and State of Missouri, have invented a new and useful Improvement in Seed-Planters; and I do hereby declare that the following is a full, clear, and exact description of the same, reference being had to the accompanying drawings, forming a part of this specification, in which—

Figure 1:
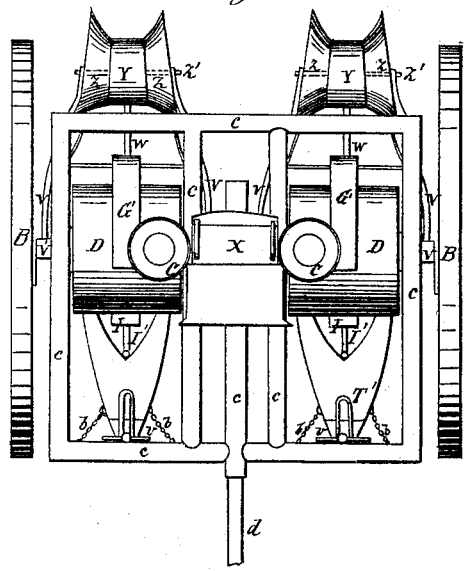
Figure 4:
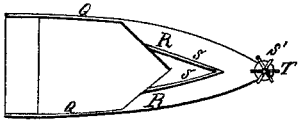
Figure 2:
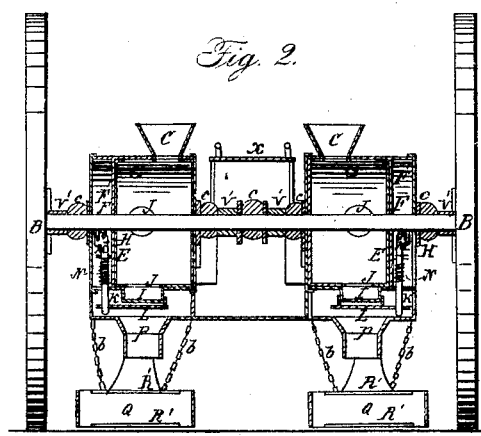
Figure 3:
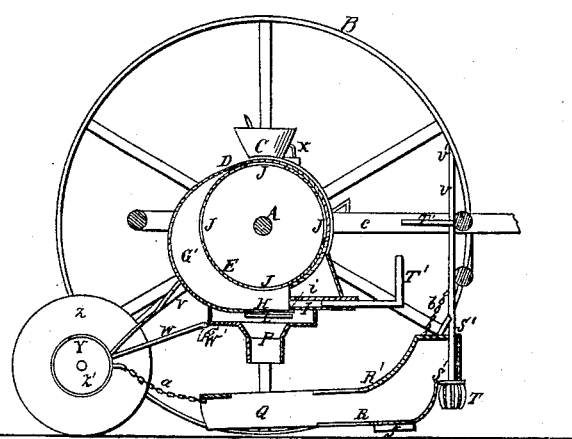

Figure 1 represents a top view, Fig. 2 a vertical cross-section, Fig. 3 a vertical longitudinal section, and Fig. 4 a bottom view of a detached portion, of the seed-planter.

Similar letters of reference in each of the several figures indicate corresponding parts.

The nature of my invention consists, first, in the construction and arrangement of the inner cylindrical distributing device with the outer cylindrical case, flap-valve, axle, and cut-off, in the manner hereinafter described.

It consists, second, in combining the seed-dropping valve with a pivot, flap-valve, and double spiral spring, in order that the valve may be allowed to work whichever way the axle may turn, and still be closed with a strong spring force.

It consists, third, in a novel arrangement of the revolving weed cutter or clearer, in combination with the furrow-openers and the moving frame of the planter.

To enable others skilled in the art to make and use my invention, I will proceed to describe its construction and operation.

The seed-planter rests on two driving-wheels, B B, upon an axle, A, to which latter the main frame $c$ is hung. This axle extends through and supports also two or more seed-boxes, D, between which the driver's seat X is arranged.

Behind each seed-box two wheels or rollers, Z Z, constructed with tapering rims, are arranged upon shafts Z' Z', extending from a central circular piece, Y, the sides of which are not parallel, but oblique in relation to each other. The ends of the shafts Z' Z' have their bearings in the ends of rods V, which are hung to axle A at V'. A rod, W, extending from the central guide-piece, Y, is hooked to the seed-box at W' to prevent the piece Y from turning round. The obliquity of the sides of guide-piece Y is such that the narrowest portion of the piece is in rear. By this means it will be seen the tapering rims of the rollers Z Z approach each other toward the rear. Thus the earth thrown up from the furrow is compressed in a double manner, first, by the tapering shape of the rim of the rollers, and, second, by their oblique position toward each other.

The plows or runners Q are constructed with flat bottoms R, which are intended to run upon the ground and steady the action of the plow, and prevent it from cutting too deep. These bottoms or runners R are open at top, so as to admit the grain through them, and are provided with V-shaped plowshares S, which are intended to open the furrow. The plows are hung in front to the main frame $c$, and behind to the guide-piece Y, as represented. A many-bladed cutter, a horizontal cross-section of which would be spear-shaped, is arranged (in front and a little above the V-shaped plowshare S) upon the lower end of a shaft, U, which has its bearings in the front part of the plow at S' S', and passes through a slotted guide-piece, T', extending from the main frame. The upper end of the shaft U is provided with a handle, U', convenient for the driver to take hold of and turn round for the purpose of causing the cutter T to cut grass, weeds, &c., which may have accumulated in front of the plow, and are apt to obstruct its operation if not removed.

The two seed-boxes represented in the drawings are of similar construction, and it will therefore be sufficient to describe one only. The seed-box D is of a cylindric shape. Its hollow space is divided in two by means of a partition, F'. The space inside of this partition contains the distributing-cylinder E, which is permanently keyed to the axle A in order to revolve, while the seed-box remains stationary in relation to the axle A and distributing-cylinder. That portion of cylinder E which corresponds with the hopper-mouth C is provided with an opening, G, which will arrive underneath the hopper-mouth once during each revolution. The other portion of the cylinder, which corresponds with the recess G' in the circumference of the seed-box, is pierced with a number of holes, J. The bottom part of the recess G' is open at H, and a valve, L, is arranged underneath this portion of the recess, which, when in the position represented in the drawings, closes the openings H. Another sliding valve, I, attached to a valve-rod, I', is arranged so as to slide through a slot, $i$, in the recess G' above the opening H. The driver can close up this opening more or less by operating the valve-rod I' and sliding the valve I over said opening H.

The valve L is fastened to a pivot, K, which extends into and has its bearings in the space F' of the seed-box. The upper end of the pivot K is formed into a flap, M, which is struck by a pin, O, on the axle A once during each revolution of the latter. Two spiral springs are applied to the pivot K, their tension acting in opposite directions, so that the flap may be struck by the pin O on either side and be forced back to its original position as soon as the pin slips off the flap. Thus the valve L is caused to turn, together with its pivot K, so as to recede from the openings H, and again return to its original position once during each revolution of the shaft A. The seed is placed into hopper C, and a portion of it enters the cylinder E as often as the opening G passes underneath the mouth of the hopper. The seed thus contained in the distributing-cylinder E passes through the holes J into recess G', and out at H, and through tube P onto the ground as often as the valve L recedes from underneath the openings H. The seed thus dropped into the furrow made by the plowshares S is then covered and pressed into the earth by the action of the tapering and oblique rollers Z Z. The driver can regulate the quantity of seed dropped at each time the valve L recedes by adjusting the valve I. The cutter-rods U and handles U' are also a convenient means for the driver to lift up the plows whenever obstructed by big stones or the like. This, however, may be effected by the driver so throwing his weight on the seat that the rear part of the moving frame overbalances the front part and its attachments.

What I claim as my invention, and desire to secure by Letters Patent, is—

1. The construction and arrangement of the inner cylindrical distributing device, E, with the outer cylindrical case, D G', flap-valve L, axle A, and cut-off I, substantially as and for the purposes set forth.

2. Combining the double spiral spring N, valve L, pivot K, and flap M in the manner described, and for the purpose set forth.

3. Arranging the revolving weed-cutter T in front of each plow, the shaft of which has its bearings in the front port of the plow, in such a manner that the cutter-rod may also serve to lift the plows over obstructions, all as described, and for the purposes set forth.

The above specification of my improvement in seed-planters signed by me this 10th day of February, 1860.

ALONZO R. ROOT.

Witnesses:
RICHARD SAWARD,
GEORGE C. HARLAN.